United States Patent [19]

Brotz et al.

[11] 4,083,731

[45] Apr. 11, 1978

[54] MIXED OXIDATION PRODUCT ON THE BASIS OF BARK WAXES AND OTHER WAXES

[75] Inventors: Walter Brotz, Gersthofen; Günther Illmann, Stadtbergen; Karl Heinz Stetter, Gersthofen, all of Germany

[73] Assignee: Hoechst Aktiengesellschaft, Frankfurt am Main, Germany

[21] Appl. No.: 623,350

[22] Filed: Oct. 17, 1975

[30] Foreign Application Priority Data

Oct. 23, 1974 Germany .............................. 2450342

[51] Int. Cl.$^2$ .............................................. C08L 91/06
[52] U.S. Cl. ...................................... 106/270; 106/10; 106/271; 260/28.5 A
[58] Field of Search ......................... 106/10, 270, 271; 260/28.5 A

[56] References Cited

U.S. PATENT DOCUMENTS

| 2,662,893 | 12/1953 | Kurth | 260/428.5 |
| 2,949,374 | 8/1960 | Kendall | 106/10 |
| 3,004,856 | 10/1971 | Zinnert | 106/270 |

FOREIGN PATENT DOCUMENTS

| 1,163,309 | 2/1964 | Germany | 106/271 |

Primary Examiner—Lorenzo B. Hayes
Attorney, Agent, or Firm—Connolly and Hutz

[57] ABSTRACT

A mixture of wax acids is prepared by oxidizing by means of chromosulfuric acid a mixture of a bark wax with a further natural or synthetic wax, preferably a hydrocarbon wax. The mixture of wax acids is especially suitable as wax component in polishes.

9 Claims, No Drawings

MIXED OXIDATION PRODUCT ON THE BASIS OF BARK WAXES AND OTHER WAXES

This invention relates to a mixed oxidate, i.e. a mixed oxidation product of bark waxes and other waxes.

Waxes can be obtained from barks of trees by extraction with solvents. The so-called bark waxes are not suited as such in the usual fields of application of waxes. The reasons therefore are, in the first place, their dark color, softness, intense odor, low solvent retention, poor emulsifiability and insufficient compatibility, for example with paraffins, which are often used as constituents of wax mixtures. The bark waxes substantially maintain their disadvantageous properties also in admixture with other waxes, so that generally mixtures of this type do not answer any purpose.

It is, therefore, the object of the present invention to improve the properties of bark waxes hitherto unsuitable for industrial application, so that they can be used in a wide range.

It is known for a long time to bleach by oxidation certain types of natural waxes or synthetic waxes by a treatment with chromic acid in sulfuric acid solution, whereby valuable wax acids are obtained (cf. Ullmanns Encyclopadie der technischen Chemie, Munchen-Berlin-Wien 1967, volume 18, page 298; Laboratoriumsbuch fur die Untersuchung technischer Wachs-, Harz- und Olgemenge, Halle 1958, page 144). It is surprising that the aforesaid oxidation process cannot be used with bark waxes for several reasons. On the one hand, very stable emulsions of wax and chromosulfuric acid, which are practically unbreakable are obtained, and, on the other hand, the reaction with economically acceptable amounts of chromic acid does not result in any brightening of the wax. The major proportion of the chromic acid used is consumed for the decomposition by oxidation of definite constituents of the wax so that a visible bleaching effect is not achieved. In general, the decomposition products formed even intensify the color of the waxes which turn completely black (cf. the comparative example).

It has now been found that valuable light wax acids can be obtained from bark waxes by odidizing the latter in admixture with other waxes by means of aqueous chromosulfuric acid.

The present invention therefore provides a process for the manufacture of a mixture of wax acids by oxidizing a wax mixture with chromic acid in sulfuric acid solution which comprises oxidizing a mixture consisting of (a) 5 to 80 % by weight of a bark wax and (b) 95 to 20 % by weight of another natural wax and/or hydrocarbon wax, the hydrocarbon wax being a paraffin wax, a micro wax, or a polyolefin wax and optionally an oxidate of the said waxes.

The mixture to be oxidized preferably consists of 5 to 40 % by weight of component (a) and 95 to 60 % by weight of component (b).

It could not have been foreseen that it would be possible to bleach bark wax with chromosulfuric acid in admixture with other waxes while avoiding the formation of an emulsion, rather it could be expected that the bark wax transfers its emulsifying effect to the concomitantly oxidized wax. It could not have been foreseen either that in admixture with other waxes bark wax could be transformed with chromosulfuric acid into light raffinates using the low amounts of chromosulfuric acid common in the bleaching of other waxes, whereas it is practically not brightened but rather acquires a darker color when it is treated alone with chromic acid. Moreover, by the mixed oxidation the other detrimental properties of the untreated bark waxes unexpectedly disappear. The mixed oxidates obtained have a high hardness, are free from odor, have improved emulsifying properties and are well compatible with paraffins.

Bark waxes in the sense of the present specification are intended to include waxes obtained by extracting wax-containing tree bark with a solvent. Bark waxes are described, for example by A. H. Warth in "The Chemistry and Technology of waxes", New York 1956, pages 251 to 267. They are found especially in the bark of coniferales, for example of the Douglas fir. The bark waxes can be isolated by extraction of ground bark with solvents or solvent mixtures, for example as described in U.S. Pat. Nos. 2,662,893; 3,616,201, or 3,789,059. For the purpose of the invention crude commercial bark waxes in the form of dark brown to black lumps or scales are used having the typical odor of freshly cut wood and a consistency like beeswax and are some times a little sticky, as well as bark waxes which have been subjected to a pretreatment, for example by oxidation with air or oxygen containing gases, by acid or alkaline saponification or by separation of certain fractions.

Suitable mixing components in the chromic acid oxidation of the bark waxes are other natural waxes of vegetal or animal origin, for example sugarcane wax, candelilla wax, ouricury wax, carnauba wax, and especially deresinified and non deresinified crude montan wax; hydrocarbon waxes including natural and synthetic paraffin waxes melting at about 40° to about 120° C, microwaxes and polyolefins. The expression polyolefins preferably means linear α-olefins having from 16 to 70 carbon atoms in the molecule, prepared for example by oligomerization of ethylene using aluminum organic catalysts, as well as polyolefin waxes having a molecular weight of from about 400 to about 15,000 obtained by homo- or copolymerization of ethylene and other α-olefins or by thermal or catalytic decomposition of polyolefins of higher molecular weight. The hydrocarbon waxes may have been pre-oxidized with air or another oxidation agent. Because of their high hardness especially suitable preoxidized polyolefins are the products obtained according to German Pat. No. 2,035,706 by oxidation with air of high molecular weight polyolefins in aqueous dispersion, which products have an acid number of up to 200. The natural waxes and the hydrocarbon waxes can be mixed with one another or with themselves in any desired proportion.

The proportion of bark wax to admixed wax depends on the type of the mixing component and the amount of bleaching agent used. When light mixing components are used, for example hydrocarbon waxes or with the use of large amounts of chromic acid, light mixed oxidates can be obtained also with a high proportion of bark wax. In general, the proportion of bark wax in the mixture subjected to chromic acid bleaching is in the range of from 5 to 80, preferably 5 to 60 and more preferably 5 to 40% by weight.

The chromic acid oxidation is carried out according to a known process by allowing to react the molten wax mixture with the hot chromosulfuric acid solution at a temperature of from 70° to 130° C. The liquid wax can be introduced while stirring into the heated chromosulfuric acid. In many cases it proved advantageous first to charge the reaction vessel with a part of the chromosulfuric acid, optionally diluted with water, and then to add the remaining bleaching acid at the rate it is consumed. The chromosulfuric acid used normally contains 60 to 140 g $CrO_3$ and 200 to 600 g concentrated sulfuric acid per liter. Depending on the type of mixing components used and the mixing proportion, 0.5 to 3 kg $CrO_3$ are generally used for bleaching 1 kg wax mixture. The oxidation time is usually 1 to 8 hours. When the reaction is terminated the raffinate is separated from the chromosulfuric acid phase, washed with dilute sulfuric acid until it is free of chrome and then with water until all acid is removed. The yields are in the range of from 80 to 90%, calculated on the weight of the wax mixture used.

The mixed oxidates according to the invention represent almost colorless or yellow wax acids having an acid number of from 30 to 200, a saponification number of 60 to 260 and a dropping point of 40° to 130° C, which are distinguished by a high hardness, do not have any odor, have good emulsifying properties, confer a high gloss, bind a large amount of solvent, can be polished and are compatible with other substances, for example paraffins. Owing to all these properties the mixed oxidates are valuable wax products with can be used with advantage in many fields of application. They can be used as wax component in polishing agents, for example for the manufacture of optionally solvent containing emulsions, dry bright emulsion or pastes for the care of shoes, floors, furniture and motorcars. They can also be used for hydrophobizing and finishing articles of wood, leather, textile, construction, and rubber industries, in corrosion protecting agents for metal, for coating and glueing together papers, for the manufacture of color solubilizers and pigment concentrates, for the manufacture of coatings for carbon paper, to protect printing inks against abrasion, as delustring agent in lacquers, as adhesive substratum for pesticides, for the manufacture of casting masses, as waxes for true-to-shape castings, for synthetic soaps, lubricants, candles, cosmetic preparations, fruit coating, as auxiliary in metal processing, for example as drawing agent or cooling lubricants, as well as auxiliaries in plastics processing, for example as lubricant and mold release agents.

In order better to adapt the properties of the mixed oxidates to the requirements in each case they can be subjected to further chemical reactions. Valuable wax esters and wax soaps can be obtained by esterifying or saponifying the oxidates, either partially or completely, according to a known process with mono- or polyhydric aliphatic alcohols or with mono- to trivalent metal ions, or by first esterifying them partly and then saponifying partially or completely the esterification products obtained.

Suitable esterification components are, for example, ethanol, propanol, butanol, stearyl alcohol, or montanol (hydrogenated montan wax); diols such as ethylene glycol, 1,2-propanediol, 1,3-butanediol, or diethylene glycol, or higher alcohols such as trimethylol propane or pentaerythritol. Suitable saponification components are, above all, the ions of the metals of the first, second and third group of the Periodic Table, for example $Li^+$, $Na^+$, $K^+$, $Mg^{2+}$, $Ca^{2+}$ and $Al^{3+}$, as well as $Pb^{2+}$ and $Cd^{2+}$. Alternatively, the mixed oxidates can be reacted with mono- or polyvalent amines and transformed into the corresponding amides whereby their properties are modified.

The esterification, saponification, partial esterification and/or partial saponification or amidation products of the mixed oxidates can be used in the same field as the mixed oxidates themselves, they are especially suitable, however, for making polishes, for example dry bright emulsions, solvent containing emulsions or pastes and as auxiliaries in plastics processing and in the processing of metals.

The process of the invention permits to put to use in a broad field of application bark wax continually forming anew in nature in large amounts and thus to save crude materials for waxes which are expensive or run short, for example fossil crude montan wax or waxes deriving from petroleum.

The following examples illustrate the invention.

EXAMPLE 1

A molten mixture of 0.5 kg non deresinified crude montan wax and 0.5 kg of a bark wax obtained by extracting the bark of Douglas fir by means of heptane and having an iodine color number of 250 and a penetration number of 9, was added while stirring to 12 liters of a chromic acid solution heated to 110° C and containing per liter 100 g $CrO_3$ and 540 g concentrated sulfuric acid.

Stirring of the reaction solution was continued for 4 hours at boiling temperature, the stirrer was switched off and the molten oxidate separating from the aqueous phase as upper layer was separated. It was washed first with 20% sulfuric acid until all chrome was removed and then with water to eliminate the acid, and finally dried. In a yield of 88% a wax having an acid number of 120, a saponification number of 154, a drop point of 83° C, a penetration number of 2 and an iodine color number of 70 was obtained. The mixed oxidate could be used for the manufacture polish emulsions.

EXAMPLE 2

A molten mixture of 0.7 kg of deresinified crude montan wax and 0.3 kg of a wax obtained by extracting the bark of Douglas fir by means of a heptane/benzene mixture and having an iodine color number of 500 and a penetration number of 7 was added while stirring to 8 liters of a chromic acid solution heated to 110° C and containing per liter 100 g $CrO_3$ and 540 g concentrated sulfuric acid. During the course of one hour a further 10 liters of oxidant were added and stirring was continued for 3 hours at boiling temperature. The molten oxidate was further processed as described in Example 1. 850 g (85%) of a wax having an acid number of 115, a saponification number of 166, a drop point of 84° C, a penetration number of 1 and an iodine color number of 7 were obtained. The mixed oxidate could be used as wax component in polish emulsions or for the manufacture of color solubilizers.

EXAMPLE 3

A mixture of 0.5 kg of the bark wax as used in Example 2 and 0.5 kg candelilla wax was bleached under the conditions of Example 2 with 18 liters of a solution containing 1.8 kg $CrO_3$ in sulfuric acid. The mixed oxidate obtained had an acid number of 108, a saponification number of 160, a drop point of 71° C and an iodine color number of 90. The wax was especially suitable for the manufacture of polish emulsions and emulsions for treating paper, textiles and wood (yield 830 g = 83 %).

EXAMPLE 4

A mixture of 0.3 kg of the bark wax as used in Example 2 and 0.7 kg carnauba wax was bleached under the conditions of Example 2. A mixed oxidate was obtained having an acid number of 95, a saponification number of 155, a drop point of 80° C, a penetration number below 1 and an iodine color number of 4 (yield 85 %).

EXAMPLE 5

Under the conditions of Example 2 a mixture of 0.6 kg of the bark wax as used in Example 2 and 0.4 kg of paraffin slab melting at 52/54° C was oxidized. The oxidate, which was harder than the paraffin used, had an acid number of 77, a saponification number of 107, a drop point of 62° C and an iodine color number of 5 (yield 90 %). The limpid melt could be diluted with any desired amount of molten slab paraffin without turbidity occurring, while a wax mixture which had not been oxidized separated into two phases when further amounts of paraffin were added.

EXAMPLE 6

Under the conditions of Example 2 a mixture of 0.3 kg of the bark wax as used in Example 2 and 0.7 kg of an α-olefin mixture obtained by polymerization of ethylene and having average chain length of 30 carbon atoms was bleached. The acid wax obtained had an acid number of 99, a saponification number of 143, a drop point of 85° C, a penetration number of 2 and an iodine color number of 3 (yield 80 %).

EXAMPLE 7

Under the conditions of Example 2 a mixture of 0.3 kg of the bark wax as used in Example 2, 0.5 kg of deresinified crude montan wax and 0.2 kg of an α-olefin having an average chain length of 30 carbon atoms was oxidized. The acid wax obtained had an acid number of 110, a saponification number of 152, a drop point of 85° C, a penetration number of 1 and an iodine color number of 7 (yield 81 %).

EXAMPLE 8

0.4 kg of the bark wax as used in Example 2 was mixed with 0.6 kg of oxidized polyethylene prepared as described in German Pat. No. 2,035,706 by oxidation with air in aqueous dispersion of a plastic-like polyethylene of higher molecular weight and having an acid number of 65, a saponification number of 110 and a drop point of 110° C. The mixture of bark wax and air oxidation product was oxidized under the conditions of Example 2. The acid wax obtained had an acid number of 147, a saponification number of 202, a drop point of 108° C, a penetration number of 1 and an iodine color number of 10 (yield 83 %).

EXAMPLE 9

500 g of the mixed oxidate of Example 1 were mixed in the molten state with 25 g of ethylene glycol and esterified at 110° C in the presence of catalytic amounts of sulfuric acid until a residual acid number of 30 had been reached. The partial ester obtained had a saponification number of 155, a drop point of 80° C and a penetration number of 3. The ester was used for making a dry bright emulsion consisting of
15 parts by weight of the wax ester
1 part by weight of olein
1 part by weight of diethyl aminoethanol
83 parts by weight of water.

An emulsion was obtained which, after having been applied to floors, dried to form a very brilliant and abrasion resistant film.

EXAMPLE 10

500 g of the mixed oxidate of Example 2 were partially esterified as described in the preceding example with 28 g ethylene glycol until a residual acid number of 18 had been reached. The partial ester obtained had a saponification number of 163, a drop point of 81° C, a penetration number of 2 and an iodine color number of 10. Part of the wax ester was used for making a polish paste from
7 g wax ester
1 g ozocerite
17 g of slab paraffin (melting point 52/54° C)
75 g white spirit The paste obtained had a good clearance, it was very hard and on application it dried to a film of high gloss. It was excellently suitable, for example, as shoe polish.

Another part of the wax ester was used as lubricant in the processing of polyvinyl chloride. To this effect a mixture consisting of
100.0 parts by weight suspension polyvinyl chloride having a K value of 65
0.5 part by weight of wax ester and
1.0 part by weight of an organo-tin stabilizer was rolled at 180° C on heated rolls. The rolling time until the sheet became sticky was 48 minutes.

An analogous mixture prepared with the addition of 1.0 part of the wax ester was rolled and pressed into a sheet 2 mm thick. The sheet had a transparency of 26 %.

EXAMPLE 11

250 g of the mixed oxidate of Example 2 were esterified with 10 g ethylene glycol until it had reached an acid number of 50, and the molten mass then esterified to an acid number of 15 by stirring with 6 g calcium hydroxide. A wax soap was obtained having a saponification number of 110, a drop point of 99° C, a penetration number of 1 and an iodine color number of 15. Like the partial ester of Example 10, the product was excellently suitable for the manufacture of polishes on solvent basis, especially in the form of pastes, as lubricant and mold release agent in plastics processing, above all for PVC.

EXAMPLE 12

An emulsion was prepared from the mixed oxidate of Example 7 having the following composition:
7 parts by weight of mixed oxidate
21 parts by weight of a partially saponified polyvinyl acetate
0.1 part by weight of 25 % ammonia solution
69.9 parts by weight water.

The emulsion could be used for hydrophobizing chip boards.

COMPARATIVE EXAMPLE 1 kg of the bark wax as used in Example 1 was oxidized as described in said example with 12 liters chromosulfuric acid. The oxidation agent had been consumed after a stirring period of 4 hours. The reaction mixture was abandoned but even after a prolonged period of time the phase of the molten wax did not separate from the aqueous phase. A blackish emulsion was obtained consisting of wax and consumed oxidant from which the wax could not be isolated without difficulty. By adding large amounts of dilute sulfuric acid a partial separation could be achieved only into an emulsion phase and a water phase. The emulsion phase was gradually freed from the consumed oxidant by repeatedly adding dilute sulfuric acid and separating the aqueous phase. When then washing with water the emulsification intensified. The wax was isolated from the emulsion phase by evaporation of the water. A blackish brown product was obtained having an iodine color number of over 1,100.

When 18 liters of chromosulfuric acid were used for oxidizing the bark wax an analogous result was obtained.

What is claimed is:

1. A process for the manufacture of a mixture of wax acids which comprises oxidizing a wax mixture at 70 to 130° C with chromic acid in sulfuric acid solution having 60 to 140 grams $CrO_3$ and 200 – 600 grams concentrated $H_2SO_4$ per liter, said mixture consisting of (a) 5 to 80% by weight of a bark wax together with (b) 95 to 20% by weight of at least one of another natural wax, a hydrocarbon wax, an oxidized hydrocarbon wax.

2. The process of claim 1, wherein the other natural wax is crude montan wax.

3. The process of claim 1, wherein the hydrocarbon wax is a paraffin wax, a microwax, or a polyolefin wax.

4. The process of claim 3, wherein the polyolefin wax is a linear $\alpha$-olefin having from 16 to 70 carbon atoms in the chain.

5. The process of claim 1, wherein the mixture consists of 5 to 40% by weight of (a) and 95 to 60% of (b).

6. The product prepared by the process of claim 1 having an acid number of from 30 to 200, a saponification number of 60 to 260 and a drop point of from 40° to 130° C.

7. The product of claim 6, consisting of the oxidate of a mixture of a bark wax with crude montan wax.

8. The product of claim 6 consisting of the oxidate of a mixture of a bark wax with a paraffin wax, a microwax or a polyolefin wax.

9. The product of claim 8 wherein the polyolefin wax is a linear $\alpha$-olefin having from 16 to 70 carbon atoms in the chain.

* * * * *